3,576,708
ASBESTOS MATERIALS OF HIGH DIELECTRIC STRENGTH AND METHOD OF MAKING SAME

Richard C. Breiner, Florham Park, N.J., assignor to Nicolet Industries, Inc., Florham Park, N.J.
No Drawing. Filed Feb. 21, 1968, Ser. No. 707,308
Int. Cl. D21h 5/18
U.S. Cl. 162—138
4 Claims

ABSTRACT OF THE DISCLOSURE (1) Asbestos articles of improved dielectric strength are made by distributing pulverulent exfoliated vermiculite throughout an asbestos fiber-binder composition; approximately 1 part of verimculite is present per 1–5 parts of asbestos.

(2) A material of great dielectric strength is made by wetting the ordinary sheet of the above composition with water solutions of aluminum phosphate or certain silico fluorides, pressing the wet sheet at elevated pressure for a time to increase the density thereof and, then drying the wet, pressed article.

BACKGROUND OF THE INVENTION

This invention relates to asbestos paper and millboard articles. Particularly, the invention relates to asbestos articles of excellent dielectric strength and methods of preparing such articles.

Asbestos paper and millboard is widely used for electrical purposes where resistance to heat is also necessary, for example, element supports in electric toasters. It is of interest in electrical laminates and printed circuit boards.

However, where exceptional dielectric strength is required, specially treated mica sheet material is used.

OBJECTS

It is an object of this invention to provide asbestos articles having improved dielectric strength.

A special object of this invention is to provide asbestos articles competitive in dielectric strength, at equivalent density, with the best mica sheet articles available today.

Other objects will be apparent in the detailed description of the invention.

SUMMARY OF THE INVENTION (I) The asbestos articles of the invention, usually paper sheets or millboard sheets, consist essentially of asbestos fiber and binder therefor, having distributed therethrough pulverulent exfoliated verimculite in approximately 1 part by weight for each 1–5 parts by weight of said asbestos, said sheet article being characterized by a higher dielectric strength than an asbestos-binder sheet article not containing said verimculite.

(II) One embodiment of the asbestos article of the invention characterized by dielectric strength competitive with commercial mica sheet is made by:

(a) wetting with an aqueous medium an ordinary dry asbestos sheet article having a composition as defined by I, said medium being selected from the class consisting of water, water solution of aluminum phosphate and water solution of "cement hardener" silico fluoride;

(b) pressing said wet article at an elevated pressure above about 100 p.s.i. for a time of at least about 1 minute; and (c) drying said pressed wet article to obtain an improved asbestos sheet article having high dielectric strength.

(III) A further embodiment of the invention where a simpler composition is treated to obtain a marked increase in dielectric strength comprises:

(a) wetting with an aqueous medium an ordinary, dry asbestos article consisting essentially of asbestos fibers and binder therefor, said medium being selected from the class consisting of water, water solution of aluminum phosphate and water solution of "cement hardener" silico fluoride;

(b) pressing said wet article at an elevated pressure above about 100 p.s.i. for a time of at least about 1 minute; and (c) drying said pressed wet article to obtain an article of increased dielectric strength.

DESCRIPTION OF THE INVENTION AND EMBODIMENTS

The invention utilizes asbestos fiber; it is preferred that these be relatively clear or clean.

The asbestos fibers are made into paper or millboard by conventional techniques well known to the asbestos article field. Paper and millboard can be laminated to afford increased thickness of materials.

Any binder, organic or inorganic, can be used in preparing the paper or millboard. The ultimate intended utility of the finished article will determine the particular binder used.

The inorganic binders include any of those conventionally used in making asbestos paper and millboard. These include hydrated lime, the silicates, and Portland cement; mixtures can be used, as for example, sodium silicate and calcium lime (a hydrated lime of low magnesium content).

Organic binders may include any of the rubbers, natural or synthetic, or any of the polymers such as the polyvinyl halides, polyvinyl carboxylates, the acrylics, the polycarbonates and the like. Numerous conventionally used organic binders are set out in U.S. Pat. No. 3,356,564.

The article of the invention includes distributed throughout the asbestos fiber-binder composition pulverulent exfoliated verimculite. In general, approximately 1 part by weight of vermiculite is present for each 1–5 parts by weight of asbestos fibers present. Desirably these proportions are 1 part of vermiculite for each 1–3 parts of asbestos fibers.

The articles of the invention include a pulverulent exfoliated (thermally expanded) vermiculite. The vermiculite granules may range from a powder to coarse grains depending upon the particular form of the article. Thin papers will use finer powders. The pulverulent vermiculites available commercially as Verxite Granules which range in size from about 16 U.S. screen size to smaller than 300 U.S. screen size are especially suitable, Verxite Granules being a trademark of the Zonolite Division of W. R. Grace & Co. for a lightweight, sponge-like mineral substrate.

On an overall basis the article of the invention consists essentially of asbestos fiber, approximately 35–70%; binder material, approximately 4–30%; and distributed therethrough approximately 20–48% of pulverulent, exfoliated vermiculite. (These ingredients do not include phosphates or silico fluoride which may be added in some embodiments.)

Articles of the invention of improved dielectric strength, as compared to the commercial asbestos fiber-binder materials, are made by conventional paper or millboard production techniques. Broadly these steps are:

(1) Mixing of furnish ingredients, i.e., fiber, vermiculite, and binder in standard paper making beaters, pulpers and stock chests.
(2) Production of the sheet on a standard cylinder wet machine, cylinder board machine, or Fourdrinier paper machine.
(3) Drying of the sheet product on conventional drying drums or oven.

It has been discovered a very great increase in dielectric strength is obtained when the (ordinary) dry paper or dry millboard made by the above conventional procedure is further treated as follows:

(4) Re-wetting (spray or dip) with either water, aluminum phosphate or silico fluoride, and subsequent pressing at elevated pressure to further consolidate the article.
(5) Re-drying on conventional equipment.

The wetted article is pressed desirably at a pressure above about 100 p.s.i. for a time of at least 1 minute. Preferably the pressing is at a pressure of about 150–500 p.s.i. for a time of about 2–10 minutes.

The wetting is by an aqueous medium which may be water, a water solution of aluminum phosphate, or a water solution of "cement hardener" silico fluoride. Water here is used in the sense of pure water, potable water, and water containing only insubstantial amounts of dissolved materials which are not deleterious to the properties of the final product.

Aluminum phosphate usage in bonding asbestos fibers is well known; U.S. Pats. 2,460,344 (Greiger) and 2,702,068 (Spooner) are illustrative. Silico fluoride (fluosilicate; fluorosilicate) is used as a hardener and porosity reducing agent. Any "cement hardener" silico fluoride may be used. Magnesium, zinc and aluminum silico fluorides are preferred with the magnesium most preferred. When the salts are used enough solution is used to provide a salt pickup of about 1–25%; higher amounts may be picked up. In general the pickup is between about 8 and 20%. The amount of pickup is calculated on the total weight of ordinary dry article passed to the re-wetting operation.

It has also been discovered that articles made of asbestos fibers and binder—in the absence of vermiculite—are benefitted by the treating operation as described above.

The treated final article is of greatly increased dielectric strength over the ordinary dry asbestos article.

EXAMPLES

The invention is illustrated by the following working examples; however, it is to be understood these examples do not limit the scope of the invention.

Millboard was made in accordance with steps 1–3 listed above and steps 1–5 listed above. The asbestos fiber was Johns-Mansville Paperbestos 5, a relatively clean fiber. The vermiculite was Verxite FCF from Zonolite Division, W. R. Grace Company—this grade is 200–300 U.S. screen size.

The untreated board (ordinary dry article) had a thickness of 70 mils; a density of 45–65 lbs./cubic foot. The pressing step was carried out at 200 p.s.i. for 5 minutes. The pressed board had a thickness of 50 mils; a density of 55–75 lbs./cubic foot. The dielectric strength—volts per mil—was obtained. Results of these tests are listed in Table I.

For comparison: Commercially available asbestos fiber millboards have dielectric strength in the range of 20–100 with densities in the range of 65–85 lbs./cubic foot. A mica sheet, accepted by the trade as a product of high quality in respect to electrical properties, has a dielectric strength of 208; a density of about 100 lbs./cubic foot.

Table I shows that the untreated (ordinary dry) millboard of the invention is in all cases equal or reasonably close to the top dielectric grade of asbestos millboard available commercially; by proper selection of the proportions of asbestos fiber and vermiculite and the type of binder, ordinary dry millboard far exceeding the presently available asbestos board in dielectric strength is obtained (Test C).

TABLE I

| Tests: | A | B | C | D | E | F | G | H | I |
|---|---|---|---|---|---|---|---|---|---|
| Furnish ingredients: | | | | | | | | | |
| Vermiculite, percent | Zero | 27 | 45.5 | Zero | 23 | 36 | Zero | 28 | 47.5 |
| Asbestos, percent | 91 | 64 | 45.5 | 72 | 49 | 36 | 95 | 67 | 47.5 |
| Calcium lime, percent | 4.5 | 4.5 | 4.5 | | | | | | |
| Sodium silicate, percent | 4.5 | 4.5 | 4.5 | | | | | | |
| Portland cement, percent | | | | 28 | 28 | 28 | | | |
| Polyvinyl chloride, percent | | | | | | | 5 | 5 | 5 |
| Dielectric strength—volts per mil | | | | | | | | | |
| Results: | | | | | | | | | |
| Untreated board | 25 | 95 | 145 | 50 | 100 | 108 | 48 | 80 | 85 |
| Water treated, pressed | 200 | 255 | 260 | 170 | 261 | 289 | 173 | 262 | 385 |
| Aluminum phoshpate treated-pressed, 15% pickup | 185 | 212 | 272 | 139 | 214 | 262 | 150 | 250 | 356 |
| Magnesium silico fluoride treated-pressed, 15% pickup | 200 | 214 | 215 | 145 | 220 | 265 | 162 | 246 | 315 |

Table I also shows a phenomenal improvement in dielectric strength is obtained by the treating with aqueous medium of the untreated board, followed by pressing and drying. Surprisingly in all tests the water treated board gave the highest dielectric strength quality board. The water treated boards of the vermiculite invention were far superior to the typical commercial quality mica sheet. In all tests the treated boards of the invention were equal or superior to the commercial quality mica sheet.

Table I also shows that the treated millboard in the absence of vermiculite, is greatly better in dielectric strength than the available asbestos fiber millboards and approaches the commercial quality mica sheet.

Thus, having described the invention, what is claimed is:

1. A method of preparing an asbestos sheet article of improved dielectric strength which method comprises forming a dry asbestos sheet article consisting essentially of asbestos fiber and a binder therefor, said article having distributed therethrough pulverulent exfoliated vermiculite in approximately 1 part by weight for each 1–5 parts by weight of said asbestos fiber, wetting said dry asbestos sheet article with an aqueous medium selected from the group consisting of water, a water solution of aluminum phosphate and a water solution of silico fluoride cement hardener, pressing the resulting wet article at an elevated pressure above about 100 p.s.i. for a time of at least about 1 minute and drying the resulting pressed wet article to obtain an improved asbestos sheet article having high dielectric strength.

2. The method of claim 1 where said pressing is at a pressure of about 150–500 p.s.i. and said time is about 2–10 minutes.

3. The method of claim 1 where said wetting medium is water.

4. An improved asbestos article made in accordance with claim 1.

References Cited

UNITED STATES PATENTS

| | | | |
|---|---|---|---|
| 2,388,187 | 10/1945 | Sallé | 162—225X |
| 2,538,236 | 1/1951 | Denning | 162—181X |
| 2,702,068 | 2/1955 | Spooner | 161—191 |
| 3,042,578 | 7/1967 | Denning | 162—181X |
| 2,195,587 | 4/1940 | Snell | 117—126X |
| 2,553,604 | 5/1951 | Pole | 117—126X |

S. LEON BASHORE, Primary Examiner

F. FREI, Assistant Examiner

U.S. Cl. X.R.

117—126; 161—205; 162—153, 181